A. C. OHNSMAN.
LINE GUIDE.
APPLICATION FILED DEC. 12, 1912.
1,086,930.
Patented Feb. 10, 1914.
2 SHEETS—SHEET 2.
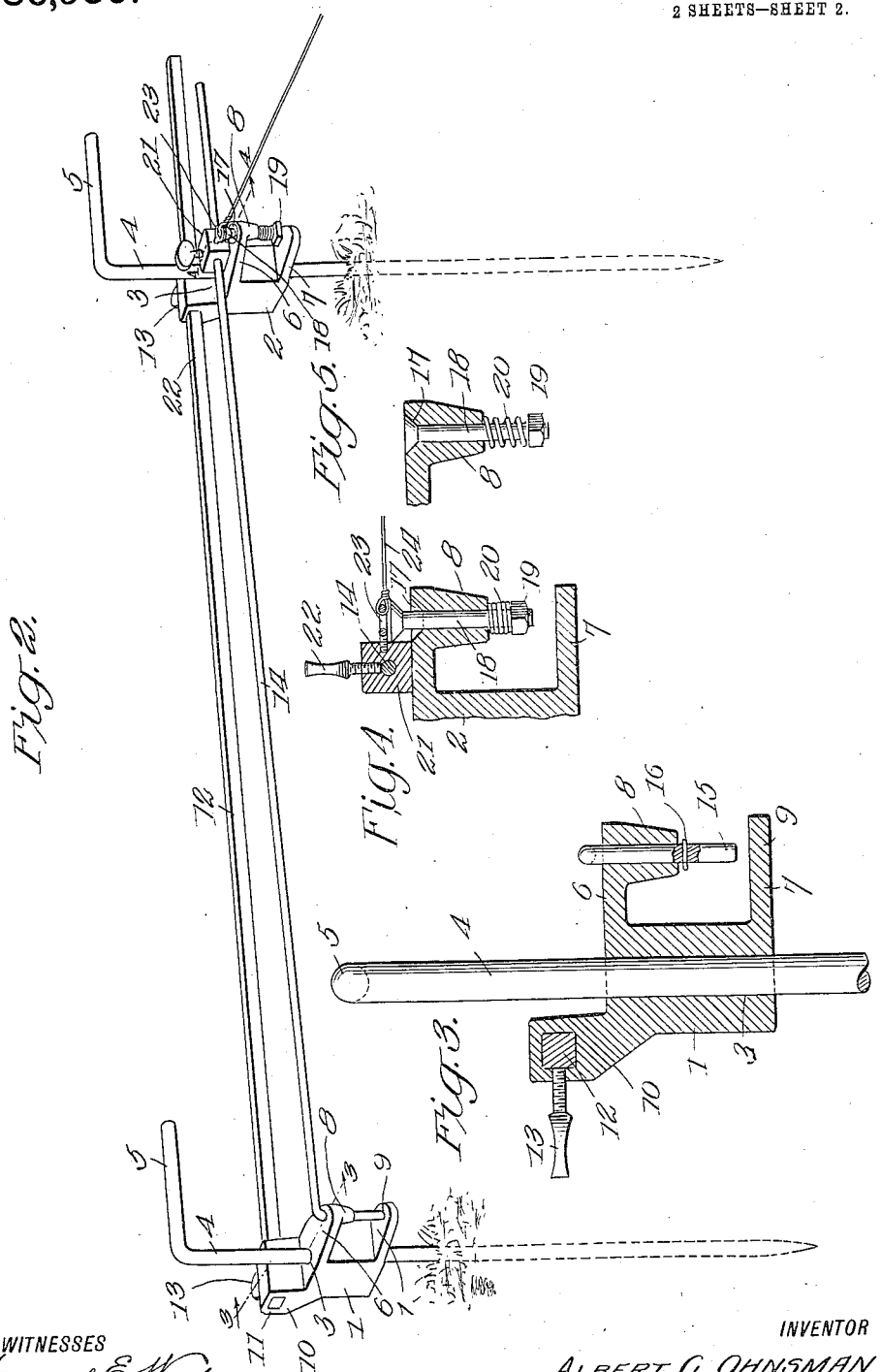
WITNESSES
Samuel E. Wade.
Chas. R. Wright
INVENTOR
ALBERT C. OHNSMAN
BY Munn & Co.
ATTORNEYS

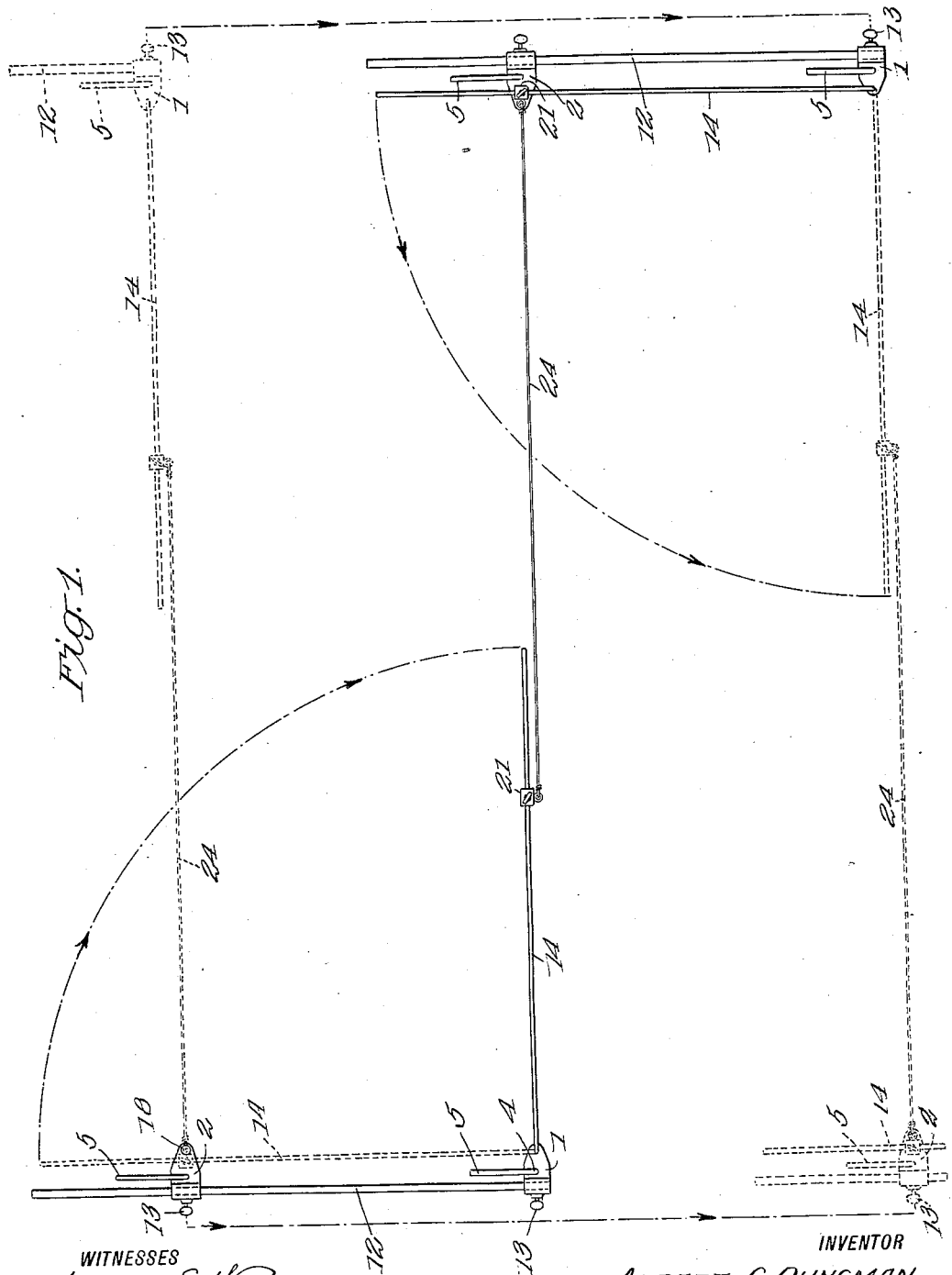

UNITED STATES PATENT OFFICE.

ALBERT C. OHNSMAN, OF COLUMBUS, OHIO.

LINE-GUIDE.

1,086,930.  Specification of Letters Patent.  Patented Feb. 10, 1914.

Application filed December 12, 1912. Serial No. 736,392.

*To all whom it may concern:*

Be it known that I, ALBERT C. OHNSMAN, a citizen of the United States, and a resident of Columbus, in the county of Franklin and State of Ohio, have invented a new and useful Improvement in Line-Guides, of which the following is a specification.

My invention is an improvement in line guides, and has for its object the provision of simple, inexpensive, and easily transportable means for holding a line at each end of the field to be planted, so arranged that the line will be held tight during the planting, and when the row is planted the succeeding line may be indicated.

In the drawing, Figure 1 is a diagrammatic plan view of the device in use, Fig. 2 is a perspective view of the guide at one end, Figs. 3, and 4 are sections on the line 3—3 and 4—4, of Fig. 2, and Fig. 5 is a view similar to Fig. 4 showing the parts in another position.

The present embodiment of the invention comprises a plurality of holding devices 1 and 2, each in the form of a block having a central opening 3 for receiving a stake 4 of metal or the like, said stake having an angular handle portion 5 at its upper end, for convenience in driving and withdrawing the stake. Each of the holding devices 1 and 2 is provided at one side with a pair of oppositely extending vertically spaced parallel lugs or arms 6 and 7, and the arm 6 is provided with a vertical hub or bearing 8. Each of the blocks is also provided with an extension 10 having a horizontal transverse opening 11, for receiving one end of a bar 12 and a set-screw 13 is threaded through the extension, for engaging the bar 12 to prevent movement of the bar through the bearing.

A rod 14 is provided, the said rod having at one end an angular portion 15 which passes through the bearing 8 in the arm 6 of the block 1. A pin 16 is passed through the lower end of the angular portion 15, below the bearing 8, for limiting the upward movement of the said angular portion. The other end of the rod 14 rests upon the upper face of the arm 6 of the block 2. The upper end of the opening through the bearing 8 is countersunk as shown at 17 and a screw bolt 18 is passed through the bearing, the head of the bolt fitting the countersink 17. The lower end of the bolt 18 is engaged by a nut 19, and a coil spring 20 encircles the bolt between the nut 19 and the lower end of the bearing 8. The spring normally holds the bolt in the position shown in Fig. 5, and when the rod 14 is in the position shown in Figs. 2 and 4, the pressure of the rod prevents downward movement of the bolt.

A block 21 is mounted to slide on the rod 14, and a set-screw 22 is threaded through the block and engages the block to fix the block with respect to the rod. The block is provided with an eye 23 at the side remote from the bar 12 and the line 24 has one of its ends engaged with the ring.

In operation, a pair of holding devices and a bar 12 is arranged at each side or end of the field as shown in Fig. 1. Each of the bars 12 is arranged in a position transverse to the rows, and the said bars are parallel with each other. The bars are held in this position, by means of the stakes 4. At one end of the field, the rod 14 is arranged parallel with the bar 12, while at the other end the said rod is arranged at right angles to the bar 12. The line 24 extends from the block 21 at one end of the field to the block 21 at the other end and forms a guide for the proper planting of the row.

The operator plants from the holding device at the top of Sheet 1 of the drawing toward the holding device at the lower end of the sheet. When the operator reaches the end of the row he pulls the stakes 4 which connects the bar 12 at that end of the field to the ground, thus releasing the holding devices at that end of the field, that is the holding devices at the bottom of Sheet 1 of the drawing. The releasing of the said holding devices from the ground slacks the line 24, thus releasing the pressure on the bolt 18, and the spring 20 presses the bolt downwardly into the position of Fig. 5, releasing the bar 14, and permitting the said bar to swing into the dotted line position at the right and top of Sheet 1. The operator now carries the bar 12 and connected parts which have just been released to the right, or to the dotted line position at the bottom and right of Sheet 1 of the drawings. Here he again anchors the said device, and swings the rod 14 into engagement with the bolt 18 at that end of the field, thus holding the rod 14 parallel with the bar 12. The rod 14 at the other end of the field, that is at the top of Sheet 1 of the drawing is perpendicular to the bar 12, as indicated in dotted lines at the extreme right and top of Sheet 1 of the drawing. The operator now plants toward the other end of the field, that is from the bottom to the top of Sheet 1. This process is continued until the planting is finished. It will be understood that each of the holding devices is moved two rows at each movement.

The rod or arm 14 at the end of the field remote from the operator is held against the bolt 18 and holds the said bolt in the position of Fig. 4. As soon however as tension on the line 24 is released, the spring 20 will move the bolt 18 into the position of Fig. 5. The said bolt 18 and the spring 20 constitute a releasable latch device.

I claim:—

1. A device of the character specified, comprising a plurality of bars, and anchoring devices for each end of each bar, each of the said devices comprising a block having an opening for receiving a stake and having an extension provided with a bearing for receiving one end of a bar, a set-screw threaded through the extension for engaging the bar to prevent longitudinal movement thereof on the bar, each of the said blocks having a pair of vertically spaced laterally extending arms, the upper end of each block having a bearing, a rod having an angular portion engaging the bearing of one block, a latch device engaging the bearing of the other block, a spring normally forcing the said device downwardly, a block slidable on the rod, said block being adapted to engage the latch device to prevent downward movement thereof, a line connecting the blocks, and a set screw threaded through the block for engaging the rod.

2. A device of the character specified, comprising a holding device for each end of the line, each of the said devices comprising a pair of blocks each having an opening for receiving a stake for holding the block to the ground and a bearing, a bar engaging the bearings of the blocks, means for clamping the bar to each block, an arm mounted to swing on one of the blocks, a stop on the other block for engaging in front of the arm to hold the arm from outward movement, a spring normally pressing the stop downward, a block slidable on the arm, said stop being adapted to engage the block on the arm to prevent lateral movement of the arm and to hold the stop in elevated position, and a line connecting the blocks of the holding devices.

3. A device of the character specified, comprising a holding device for each end of the line, each of the said devices comprising a pair of blocks each having an opening for receiving a stake for holding the block to the ground and a bearing, a bar engaging the bearings of the blocks, means for clamping the bar to each block, an arm mounted to swing on one of the blocks, a spring pressed latch device on the other block for engaging in front of the arm to prevent said arm from swinging outwardly, said latch being held in upward position by the pressure of the arm and arranged to release the arm when such pressure is relaxed, and a block slidable on the arm and having means for clamping the block to the arm, and a line connecting the last named blocks.

4. A device of the character specified, comprising a holding device for each end of the line, each of the said devices comprising a bar, means at each end of the bar and adjustable on the bar for anchoring the bar to the ground, an arm mounted to swing on the said anchoring means, a vertically movable stop on the other of the said means for engaging in front of the arm to hold the said arm, a spring pressing the stop downwardly to release the arm, said stop being held in upward position by the pressure of the arm, and means adjustable on each arm for holding one end of a line.

5. A device of the character specified, comprising a pair of bars, means for anchoring each of the said bars in place, an arm mounted at one end of each bar for swinging movement of the free end of the arm toward and away from the bar, a releasable latch device for holding each arm normally in parallelism with the bar, and means on each arm for holding one end of the line.

6. A device of the character specified, comprising a holding device for each end of the line, said device comprising an arm mounted to swing on each of the said holding devices, means on each of the said holding devices for normally preventing outward swinging movement of the arm away from the said holding device, a spring acting normally to move the said holding means into inoperative position, said holding means being held against movement by the spring by the pressure of the said arm, and means on each arm for holding one end of the line, said means being adjustable on the arm, and means for securing each of the said holding means in adjusted position.

7. A device of the character specified, comprising a holding device for each end of the line, said device comprising an arm mounted to swing on each of the said holding devices, means on each of the said holding devices for normally preventing outward swinging movement of the arm away from the said holding device, a spring acting normally to move the said holding means into inoperative position, said holding means being held against movement by the spring by the pressure of the said arm, and means on each arm for holding one end of the line.

ALBERT C. OHNSMAN.

Witnesses:
C. A. SPENCE,
L. H. MASTELLER.

Copies of this patent may be obtained for five cents each, by addressing the "Commissioner of Patents, Washington, D. C."